United States Patent
Li et al.

(10) Patent No.: US 10,233,385 B2
(45) Date of Patent: Mar. 19, 2019

(54) WELL TREATMENT METHODS AND FLUIDS WITH GLDA SALT

(71) Applicant: BAKER HUGHES INCORPORATED, Houston, TX (US)

(72) Inventors: Leiming Li, Sugar Land, TX (US); Magnus Legemah, Richmond, TX (US); Jia Zhou, Spring, TX (US); Xiaolan Wang, Spring, TX (US); Ahmed Gomaa, Spring, TX (US); Hong Sun, Houston, TX (US)

(73) Assignee: BJ Services, LLC, Tomball, TX (US)

( * ) Notice: Subject to any disclaimer, the term of this patent is extended or adjusted under 35 U.S.C. 154(b) by 610 days.

(21) Appl. No.: 14/753,942

(22) Filed: Jun. 29, 2015

(65) Prior Publication Data
US 2016/0376881 A1    Dec. 29, 2016

(51) Int. Cl.
*C09K 8/68* (2006.01)
*C09K 8/035* (2006.01)
(Continued)

(52) U.S. Cl.
CPC .............. *C09K 8/685* (2013.01); *C09K 8/035* (2013.01); *C09K 8/725* (2013.01); *C09K 8/86* (2013.01); *C09K 8/887* (2013.01)

(58) Field of Classification Search
CPC .......... C09K 8/68; C09K 8/685; C09K 8/035; C09K 8/725; C09K 8/86; C09K 8/887
See application file for complete search history.

(56) References Cited

U.S. PATENT DOCUMENTS

| | | |
|---|---|---|
| 7,584,791 B2 | 9/2009 | Robb et al. |
| 8,017,563 B2 | 9/2011 | Freeman et al. |

(Continued)

FOREIGN PATENT DOCUMENTS

| | | |
|---|---|---|
| WO | 2009111324 | 9/2009 |
| WO | 2013116422 | 8/2013 |
| WO | 2013160332 | 10/2013 |

OTHER PUBLICATIONS

Elkatatny, Salaheldin Mahmoud; New Techniques to Characterize and Remove Water-Based Drilling Fluids Filter Cake, Doctoral dissertation, Texas A&M University; Available electronically from http://hdl.handle; Mar. 29, 2013; Abstract only.

(Continued)

*Primary Examiner* — Zakiya W Bates
*Assistant Examiner* — Crystal J Miller

(57) ABSTRACT

A well servicing fluid includes ingredients including a GLDA salt, a crosslinker, and a viscosifying agent that is not crosslinked by the crosslinker. A well treatment method includes forming a well servicing fluid with ingredients including a GLDA salt, a viscosifying agent, and a crosslinker, the GLDA salt containing a metal cation chelated with a GLDA anion. The well servicing fluid is inserted into a well in a formation. The method includes crosslinking the viscosifying agent and attaining a first viscosity of the well servicing fluid using the crosslinker. After the attaining of the first viscosity, viscosity of the well servicing fluid in the well is decreased to a second viscosity less than the first viscosity by using the GLDA anion. The GLDA salt may be a GLDA calcium salt and the crosslinker may be a zirconium crosslinker.

16 Claims, 2 Drawing Sheets

(51) Int. Cl.
*C09K 8/72* (2006.01)
*C09K 8/86* (2006.01)
*C09K 8/88* (2006.01)

(56) References Cited

U.S. PATENT DOCUMENTS

| | | | |
|---|---|---|---|
| 2008/0190609 A1* | 8/2008 | Robb | C09K 8/68 166/279 |
| 2009/0023613 A1 | 1/2009 | Li et al. | |
| 2009/0318313 A1 | 12/2009 | Ali et al. | |
| 2011/0061870 A1 | 3/2011 | Navarro et al. | |
| 2011/0166050 A1 | 7/2011 | Li et al. | |
| 2011/0214862 A1 | 9/2011 | Horton et al. | |
| 2011/0214874 A1 | 9/2011 | Dakin et al. | |
| 2012/0115759 A1* | 5/2012 | Reyes | C09K 8/524 507/241 |
| 2012/0186811 A1 | 7/2012 | Welton et al. | |
| 2012/0202720 A1 | 8/2012 | de Wolf et al. | |
| 2012/0247774 A1 | 10/2012 | Li et al. | |
| 2012/0279711 A1 | 11/2012 | Collins et al. | |
| 2013/0000913 A1 | 1/2013 | Welton et al. | |
| 2013/0203637 A1 | 8/2013 | Gupta et al. | |
| 2013/0213659 A1 | 8/2013 | Luyster et al. | |
| 2013/0264060 A1 | 10/2013 | De Wolf et al. | |
| 2013/0267446 A1 | 10/2013 | De Wolf et al. | |
| 2013/0274154 A1 | 10/2013 | Nasr-El-Din et al. | |
| 2013/0274155 A1 | 10/2013 | Nasr-El-Din et al. | |
| 2013/0281329 A1 | 10/2013 | De Wolf et al. | |
| 2014/0116710 A1 | 5/2014 | Naser-El-Din et al. | |
| 2015/0141302 A1* | 5/2015 | Nasr-El-Din | C09K 8/52 507/241 |

OTHER PUBLICATIONS

Nasr-El-Din et al.; A New, Low Corrosive Fluid to Stimulate Wells with Carbon Steel Tubular and Internals; Society of Petroleum Engineers doi: 10.2118/160849-MS; Jan. 1, 2012; Abstract only.

Mahmoud et al.; Evaluation of a New Environmentally Friendly Chelating Agent for High-Temperature Applications; Society of Petroleum Engineers; doi: 10.2118/127923-PA; Sep. 1, 2011; Abstract only.

Rabie, et al.; Reaction of GLDA with Calcite: Reaction Kinetics and Transport Study; Society of Petroleum Engineers; doi: 10.2118/139816-MS; Jan. 1, 2011; Abstract only.

Dissolvine StimWell; The Perfect Stimulation Solution; AkzoNobel; Mar. 2014, 32 pages; Akzo Nobel Functional Chemicals B.V.; www.akzonobel.com.

* cited by examiner

WELL TREATMENT METHODS AND FLUIDS WITH GLDA SALT

BACKGROUND

Wells drilled in low-permeability subterranean formations are often treated by reservoir stimulation techniques, such as hydraulic fracturing, to increase hydrocarbon production rate. High viscosity fluids may be employed to carry proppant down-hole to prop open fractures in the formation. Known linear gels (water containing a gelling agent without cross-linker) that can be operated at ambient temperature at the surface generally do not exhibit a sufficiently high viscosity to transfer proppant of a large size or large quantity. Consequently, cross-linkers may be used to increase fluid viscosity, providing adequate transport of larger proppant sizes or larger proppant quantity. Higher viscosity fluids also create wider fractures within the formation.

Guar and guar derivatives are among the most often used viscosifying agents, such as polymers, in hydraulic fracturing treatment. Guar derivatives, such as carboxymethyl guar (CMG), hydroxypropyl guar (HPG), and carboxymethyl hydroxypropyl guar (CMHPG), are predominantly used in wells with a high bottom-hole temperature (BHT). Interest in cellulose derivatives, such as hydroxyethyl cellulose (HEC), carboxymethyl cellulose (CMC), and carboxymethyl hydroxyethyl cellulose (CMHEC), has increased for fracturing treatment due to the natural abundance of cellulose.

Often, hydraulic fracturing gels include cross-linking delay additives, gel breakers, and fluid loss control additives among many other possible additives to adapt hydraulic fracturing gel to the circumstances of hydraulic fracturing. A variety of gelling agents and cross-linkers are known for use in hydraulic fracturing gel. For a delay additive, cross-linking reactions are so designed that viscosity development begins after placement of hydraulic fracturing gel deep within a well.

In a related manner, rheology modifiers, such as gel breakers, may be included in hydraulic fracturing gel to significantly decrease viscosity after fracturing for easier removal of the gel from the well. To the extent that the cross-linked gel contains a gel breaker, the gel breaker may be configured for delayed action to maintain desirable properties of the cross-linked gel while fracturing. Even so, additional rheology modifiers, such as gel breakers, are desired to provide an increased variety of options for interacting with viscosifying agents and related components.

SUMMARY

A well servicing fluid includes ingredients including a GLDA salt, a crosslinker, and a viscosifying agent that is not crosslinked by the crosslinker.

A well treatment method includes forming a well servicing fluid with ingredients including a GLDA salt, a viscosifying agent, and a crosslinker, the GLDA salt containing a metal cation chelated with a GLDA anion. The well servicing fluid is inserted into a well in a formation. The method includes crosslinking the viscosifying agent and attaining a first viscosity of the well servicing fluid using the crosslinker. After the attaining of the first viscosity, viscosity of the well servicing fluid in the well is decreased to a second viscosity less than the first viscosity by using the GLDA anion.

Another well treatment method includes forming a well servicing fluid with ingredients including a GLDA calcium salt, a polymer viscosifying agent, and a zirconium crosslinker, the GLDA calcium salt containing a calcium cation chelated with a GLDA anion. The well servicing fluid is inserted into a well in a formation. The method includes crosslinking the polymer and attaining a first viscosity of the well servicing fluid using the crosslinker. After the attaining of the first viscosity, viscosity of the well servicing fluid in the well is decreased to a second viscosity less than the first viscosity by chelating the crosslinker with the GLDA anion, which counteracts the crosslinking.

Figure 1:
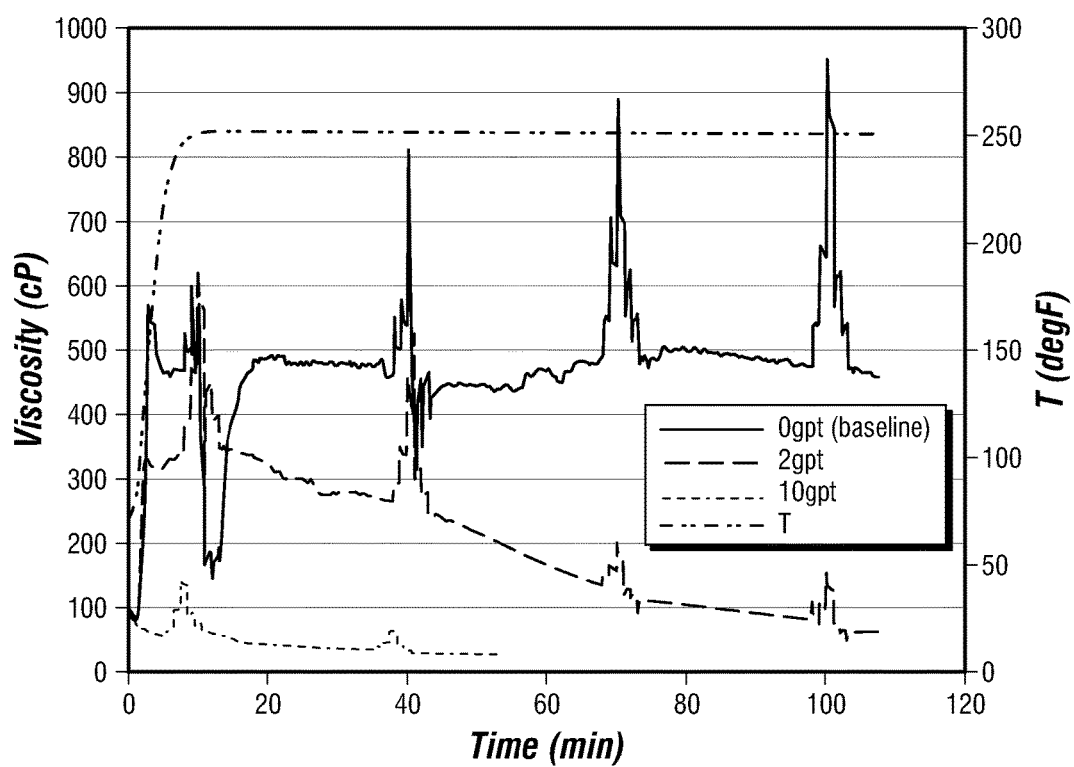
FIG. 1 shows a chart of viscosity and temperature over time for zirconate crosslinked HPG fluids containing GLDA calcium salt.

Some embodiments are described below with reference to the following accompanying drawings.

DETAILED DESCRIPTION

Observation indicates, as explained in more detail below, that GLDA (glutamic acid diacetic acid; or L-glutamic acid N,N-diacetic acid; or dicarboxymethyl glutamic acid) may be used as a rheology modifier among many oilfield applications. One example of a rheology modifier includes a gel breaker, which is an additive to a gel that decreases viscosity. A gel breaker may be a slow-release breaker, which acts over an extended time to decrease viscosity as a reactant gradually becomes available. Contrasting breakers may provide all of the reactant initially and the decrease in viscosity is only inhibited by kinetics of the breaking reaction. Breaking reactions may include counteracting crosslinking of viscosifying agents, degradation of viscosifying agents, and other reactions. A slow-release breaker may be beneficial for use in zirconate-crosslinked fluids, gelled oil systems, and crosslinked acid systems. "Zirconate" refers to a zirconium crosslinker (cation) chelated with a ligand.

GLDA presents an alternative to known ligands such as EDTA (Ethylenediaminetetraacetic acid), HEDTA ((2-Hydroxyethyl) ethylenediaminetriacetic acid), or NTA (Nitrilotriacetic acid). In addition, GLDA meets standards, such as for biodegradability giving it an excellent ecological profile. GLDA also exhibits an excellent toxicological profile. GLDA also exhibits a high solubility such that a 40 weight percent (wt %) aqueous solution is commercially available.

Uses of GLDA, mostly as chelating and/or acidizing agents, are known for oilfield applications. However, using GLDA as a slow-release breaker is not previously known, such as for fluid systems including zirconate-crosslinked fluids, gelled oil systems, and crosslinked acid systems.

Accordingly, one well treatment method includes forming a well servicing fluid with ingredients including a GLDA salt, a viscosifying agent, and a crosslinker, inserting the well servicing fluid into a well in a formation, and crosslinking the viscosifying agent. The GLDA salt contains a metal cation chelated with a GLDA anion. The method includes attaining a first viscosity of the well servicing fluid using the crosslinker and, after the attaining of the first viscosity, decreasing viscosity of the well servicing fluid in the well to a second viscosity less than the first viscosity by using the GLDA anion.

By way of example, the forming of the well servicing fluid may occur before the inserting of the well servicing fluid. By using the listed ingredients, GLDA salt, viscosifying agent, and crosslinker, an operator may first prepare the well servicing fluid according to known practices for using a rheology modifier, such as a breaker, in a well servicing fluid, such as a hydraulic fracturing gel. As a result, additional ingredients known for use in such materials may be included.

The GLDA salt may be included at a concentration in the well servicing fluid of greater than about 0.01 wt %, such as from about 0.01 to about 0.2 wt %, including from about 0.05 to about 0.1 wt %. The crosslinker may be delivered as chelated with a ligand in the form of a crosslinking agent included at a concentration in the well servicing fluid of greater than about 0.05 wt %, such as from about 0.05 to about 0.2 wt %, including from about 0.06 to about 0.12 wt %. The viscosifying agent may be included at a concentration in the well servicing fluid of greater than about 0.15 wt %, such as from about 0.18 to about 0.72 wt %, including from about 0.24 to about 0.42 wt %.

The ingredients in combination may exhibit a property such that an increased amount of GLDA salt increases a rate of the decrease in viscosity. GLDA salt may be obtained by a number of known techniques, one of which includes reaction with $CaCO_3$ as described in further detail in the Examples below. GLDA chelates with the $Ca^{2+}$ ion to produce GLDA-Ca. GLDA may coordinate with up to two $Ca^{2+}$ ions, however, designation of GLDA-Ca herein is intended to refer to the ligand coordinated with any number of ions. A similar designation herein applies to other GLDA chelates. GLDA is known as a chelant for calcium ions in uses for treatment of shale formations, such as uses described in U.S. Patent Pub. No. U.S. 2014/0116710 by Naser-El-Din et al. dated May 1, 2014. The Naser-El-Din reference involves a process that forms GLDA-Ca in a well.

In contrast, the methods and compositions herein include a GLDA salt, such as GLDA-Ca, in a method and composition not contemplated in Naser-El-Din. Without being limited to any particular theory, GLDA-Ca is hypothesized to interact with the crosslinked viscosifying agent in a manner that exchanges the calcium ion in GLDA-Ca with the crosslinker, thus counteracting the crosslinking and decreasing viscosity. As an additional benefit, since GLDA chelates $Ca^{2+}$ well, the hypothetical exchange with the crosslinker may occur over time. In this manner, the rate of the decrease in viscosity, or breaking, depends on the concentration of GLDA-Ca.

Although the metal cation in the GLDA salt of the methods and compositions herein may be calcium, it may instead or additionally include sodium, depending on the application. The metal cation may instead or additionally include a divalent cation, such as magnesium, strontium, or barium, or a cation of higher valance. The well servicing fluid may be aqueous-based or hydrocarbon-based, with GLDA-Na being noted for ineffectiveness with gelled oil, specifically, GLDA-Na with four coordinated sodium ions. Gelled oil is often crosslinked with $Al^{3+}$ or $Fe^{3+}$ compounds, which may be subject to chelation with the GLDA anion. However, if the pH of GLDA compounds (such as GLDA-4Na) is high, such as greater than 10, then the high pH itself may break gelled oil quickly instead of as a slow-release breaker.

The viscosifying agent may include guar, guar derivatives (such as HPG), polyacrylamide, or other natural or synthetic polymers. The crosslinker selected may correspond with the particular viscosifying agent selected, but may include zirconium or other cations, such as Ti, Cr, Fe, or Cu (titanium, chromium, iron, or copper) cations. Although borate crosslinkers are known, the GLDA salt used in the present method, such as GLDA-Ca, is not expected to chelate the crosslinker since borate crosslinkers are anions. As a result, presumably GLDA-Ca would not function as an effective rheology modifier, such as a slow-release breaker, in combination with borate crosslinkers. In comparison, decreasing the viscosity in the present method may include counteracting the crosslinking and using the GLDA anion may include chelating the crosslinker with the GLDA anion.

Although GLDA-4Na is known for use in delaying crosslinking, such as in U.S. Pub. No. U.S. 2013/0203637 by Gupta et al. dated Aug. 8, 2013, that form of use is distinguished from the methods and compositions herein. A zirconium crosslinker (cation) is delivered in Gupta as chelated with a ligand, acting as a crosslinking agent and releasing the zirconium crosslinker. The GLDA-4Na salt used in Gupta produces a GLDA anion. It is theorized that the GLDA anion competes with crosslinking sites of the polymer for binding to zirconium and temporarily forms GLDA-Zr, delaying the crosslinking reaction. Accordingly, Gupta uses GLDA-4Na to delay crosslinking.

It is theorized that one difference in the behavior of the sodium salt of GLDA in Gupta compared to the calcium salt of GLDA according to some methods herein results from the greater affinity that GLDA has for $Ca^{2+}$ over Nat Even though the crosslinker, such as a zirconium, and polymer may be the same, GLDA-Na functions as a crosslink delaying agent, while GLDA-Ca functions as a slow-release breaker. Without being limited to a particular theory, apparently the greater affinity that GLDA has for $Ca^{2+}$ allows crosslinking to occur and counteracting the crosslinking to follow thereafter.

As an alternative to counteracting the crosslinking, the decreasing of the viscosity may instead include oxidatively modifying rheology of the crosslinked viscosifying agent. Use of the GLDA anion may include modulating oxidation rate with the GLDA anion. In this application, GLDA functions as a chelating agent (ligand) for Fe or Cu (iron or copper) cationic catalysts useful to control the oxidation rate of oxidizers, such as $H_2O_2$. $H_2O_2$ decomposes and becomes oxidative at a relatively high temperature. Reductive species, such as $Fe^{2+}$, and $Cu^+$ effectively lower the free energy requirement for such reaction, i.e., they catalyze the oxidation reaction at lower temperatures.

As indicated above, the method includes attaining a first viscosity of the well servicing fluid and thereafter decreasing viscosity to a second viscosity less than the first viscosity. The method may include attaining the first viscosity after the inserting of the well servicing fluid into the well. That is, at the time of inserting the well servicing fluid, as in the present method, the first viscosity might not be attained. The crosslinking indicated for the method to attain the first viscosity thus would not have occurred at the time of inserting the well servicing fluid to an extent sufficient to attain the first viscosity. The attaining of the first viscosity may include increasing the viscosity. The first viscosity may be greater than about 50 cP (centiPoise) at 100 $sec^{-1}$ ($seconds^{-1}$), such as greater than about 200 cP at 100 $sec^{-1}$. The second viscosity attained after decreasing viscosity by using the GLDA anion may be less than about 100 cP at 100 $sec^{-1}$, such as less than about 20 cP at 100 $sec^{-1}$.

Decreasing viscosity of the fluid in the well may include breaking the fluid to the second viscosity, which is less than about 10 centiPoise (cP) at 100 seconds$^{-1}$ ($sec^{-1}$) or which is reduced by more than 80%, such as by more than 95%, from the first viscosity. Even though some viscosity remains, those of skill often consider a gel to be "broken" when reduced in viscosity by 80-95% or to about 10 cP at 100 sec$^{-1}$.

It is known that viscosity of a gel often decreases naturally over time even without a rheology modifier. In the methods herein, viscosity may decrease at a faster rate compared to the well treatment fluid without the GLDA salt rheology modifier. The numerical value for the decrease in viscosity and the time over which it occurs varies depending on the application. Consequently, the rate of decrease also varies. In field operations, the fluid viscosity can be very high (as in in gel plugs), just several hundred centiPoise (as in frac fluids), or just a few centiPoise (as in slick water). It will be appreciated that the larger viscosity decreases may occur in the higher viscosity fluids. Also, fluids may be formulated to break in 2 days, or to break in 2 hours. Even so, for the methods and compositions herein, the viscosity may decrease at a faster rate compared to known fluids and compared to the well treatment fluid herein without the rheology modifier.

The method may include using GLDA salt that is encapsulated by an encapsulant. The method may further include delaying release of the GLDA salt using the encapsulant until after the inserting of the well servicing fluid. Examples of encapsulants known for use with other gel breakers are described in US Pat. Pub. No. 2012/0247774 dated Oct. 4, 2014 by Li et al. (e.g., ¶44), No. 2009/0023613 dated Jan. 22, 2009 by Li et al. (e.g., ¶¶61, 65), and No. 2009/0318313 dated Dec. 24, 2009 by Ali et al. (e.g., ¶29), each of which are incorporated herein by reference.

GLDA may be obtained as a solid, such as in the form of a powder. The powder may be mixed with the other ingredients for the well servicing fluid, including the viscosifying agent, the crosslinker, and the aqueous base or hydrocarbon base. Even though GLDA salt may be capable of functioning itself as a slow-release gel breaker, encapsulation may be used to extend the time for the beginning of the release.

Hydraulic fracturing and other oil field applications benefit from flexibility in operational parameters, such as delay in the onset of rheology modification, including breaking, and variation in the rate of viscosity decrease. In keeping with the methods and compositions herein, GLDA salt may be suitable for use in hydraulic fracturing and other oil field applications. Indeed, GLDA salt may beneficially provide both properties of breaking and rate variation, as may be understood from the discussion above. As a result, the method may further include fracturing the formation using the well servicing fluid after the attaining of the first viscosity and before the decreasing of viscosity.

Treating the well with the well treatment fluid may instead include gravel packing, sand control, or other known applications for viscosified well treatment fluid, such as gel. As another alternative, the ingredients may further include an acidic solvent of carbonate, such as HCl, and the formation in which the well is formed may include a carbonate formation. The method may further include fracture acidizing the carbonate formation after the attaining of viscosity and before the decreasing of viscosity.

Crosslinked acid systems are known for use in fracture acidizing applications of carbonate formations to enhance oil and gas production. Often, such a system includes a polyacrylamide-based gelling agent, a metal crosslinker (Zr or Ti), a solvent (3-28 weight % HCl aqueous solution), and other additives such as breaker, corrosion inhibitor, etc. Fluoride salt, such as $CaF_2$, is known for use as a breaker in encapsulated form for delayed reaction. Since the binding ability of fluoride is stronger with Zr than with the Ca of $CaF_2$, flouride will favor counteracting the crosslinking in the gel network. Due to environmental considerations, a desire exists for a breaker not based on fluoride.

Chelating agents could be a candidate for fluoride replacement, but most chelating agents exhibit low solubility and poor chelating ability in an acid environment. As a result, it is not feasible to use known chelating agents, such as EDTA and NTA, as breakers in a crosslinked acid system. However, GLDA uniquely exhibits high solubility (e.g., greater than 50% in 15 weight % HCl) and strong chelating ability in acidic environments. GLDA or its salts may be used directly or in encapsulated form. GLDA may be added to a crosslinked acid system as a breaker to reduce the viscosity in a controlled manner without affecting the initial rheology of the crosslinked gel. The broken gel may still retain a low viscosity, such as greater than 10 cP at 100 sec$^{-1}$, which aids in cleanup of insoluble fines released during the reaction of acid with the carbonate formation.

The features and benefits of the present method may also be used in combination with other methods and compositions discussed herein even though not specifically indicated otherwise.

Consequently, another well treatment method includes forming a well servicing fluid with ingredients including a GLDA calcium salt, a polymer viscosifying agent, and a zirconium crosslinker. The GLDA calcium salt contains a calcium cation chelated with a GLDA anion. The method includes inserting the well servicing fluid into a well in a formation, crosslinking the polymer, and attaining a first viscosity of the well servicing fluid using the crosslinker. After the attaining of the first viscosity, the method includes decreasing viscosity of the well servicing fluid in the well to a second viscosity less than the first viscosity by chelating the crosslinker with the GLDA anion, which counteracts the crosslinking.

By way of example, the forming of the well servicing fluid may occur before the inserting of the well servicing fluid. Also, the method may further include fracturing the formation using the well servicing fluid after the attaining of the first viscosity and before the decreasing of viscosity.

The features and benefits of the present method may also be used in combination with other methods and compositions discussed herein even though not specifically indicated otherwise.

Further, a well servicing fluid contains ingredients including a GLDA salt, a crosslinker, and a viscosifying agent that is not crosslinked by the crosslinker. That is, the viscosifying agent used as an ingredient is in a state in which it is yet to be crosslinked by the crosslinker also used as an ingredient.

By way of example, the GLDA salt may be encapsulated by a release-delaying encapsulant. For example, release of the GLDA salt from the encapsulant into the well servicing fluid may occur after more than about 2 minutes, such as after more than about 5 minutes. The crosslinker may include zirconium and be provided by a crosslinking agent, such as zirconium ammonium carbonate, zirconium chloride, zirconium oxychloride, sodium zirconium lactate, zirconium malate, zirconium citrate, zirconium oxyacetate, zirconium acetate, zirconium oxynitrate, zirconium sulfate, tetrabutoxyzirconium, zirconium monoacetyl acetonate, zirconium normal butyrate, zirconium normal propylate, zirconium glycolate and zirconium lactate triethanolamine.

The crosslinker and viscosifying agent may have respective compositions and chemical structures that exhibit a property of crosslinking the viscosifying agent and increasing the viscosity of the well servicing fluid. The GLDA salt may have a composition and chemical structure that exhibits a property of decreasing the viscosity after the increasing of viscosity. The ingredients may have respective compositions and chemical structures that in combination exhibit a property such that an increased amount of GLDA salt increases a rate of the decrease in viscosity.

The GLDA salt may contain a metal cation chelated with a GLDA anion. The GLDA anion may exhibit the property of decreasing the viscosity by chelating the crosslinker with the GLDA anion, which counteracts the crosslinking. The metal cation may include Ca. The well servicing fluid may further contain an oxidative rheology modifier and the metal cation may include Fe or Cu. The well servicing fluid may further include an acidic carbonate solvent.

The features and benefits of the present composition may also be used in combination with other methods and compositions discussed herein even though not specifically indicated otherwise.

Example 1

To prepare the GLDA slow-release breaker, 20 g $CaCO_3$ powder was added into 50 mL DISSOLVINE STIMWELL HTF (40% GLDA, pH-4, from AkzoNobel N.V.) in a bottle. $CO_2$ bubbles were generated upon contact of the $CaCO_3$ and GLDA. After a couple of hours at room temperature (RT), the reaction between the $CaCO_3$ and GLDA appeared over (no more bubbles). The final fluid appeared grey, with a total volume of about 60 mL, and a pH of about 6.2-6.3.

Example 2

The baseline (no or 0 gpt (gallons per thousand gallons) of the GLDA breaker solution prepared in Example 1) zirconate-crosslinked HPG fluid was prepared with Tomball, Tex. tap water, 2% KCl, 0.4 gpt BF-10 L buffer (from Baker Hughes, Inc.), 40 ppt (pounds per thousand gallons) HPG, 2 ppt $NaHCO_3$ powder, 1 gpt GS-1 L gel stabilizer (from Baker Hughes, Inc.), 1 gpt XLD-1 crosslinking delayer (from Baker Hughes, Inc.), and 2.4 gpt XLW-22C (Zr crosslinking agent from Baker Hughes, Inc.). The HPG polymer was allowed to fully hydrate in water (it usually took about 20 minutes in a 1 L Waring blender) with KCl and BF-10 L before other additives were added. The fluid thus prepared had a pH of about 6.6 at RT, and a vortex closure time longer than 10 minutes at RT. The viscosity at 250° F. was measured with a Chandler5550 viscometer as shown in FIG. 1, following the API RP 39 schedule (Advanced Petroleum Institute, Recommended Practice on Measuring the Viscous Properties of a Cross-Linked Water-Based Fracturing Fluid). The viscosity (at 100/s shear rate) stayed stably at 400-500 cP during the test for about 2 hours.

In another test, the zirconate-crosslinked HPG fluid was similarly prepared. 2 gpt of the GLDA breaker solution from Example 1 was added to the gel, and the viscosity was similarly measured at 250° F., shown in FIG. 1. With 2 gpt of the GLDA breaker, the fluid viscosity dropped gradually and nearly linearly. The viscosity dropped controllably to about 50 cP at about 2 hours.

In the third test, 10 gpt of the GLDA breaker solution was added to the similar zirconate-crosslinked HPG fluid. The fluid viscosity at 250° F. quickly dropped to below 100 cP within minutes, as shown in FIG. 1.

Example 3

Figure 2:
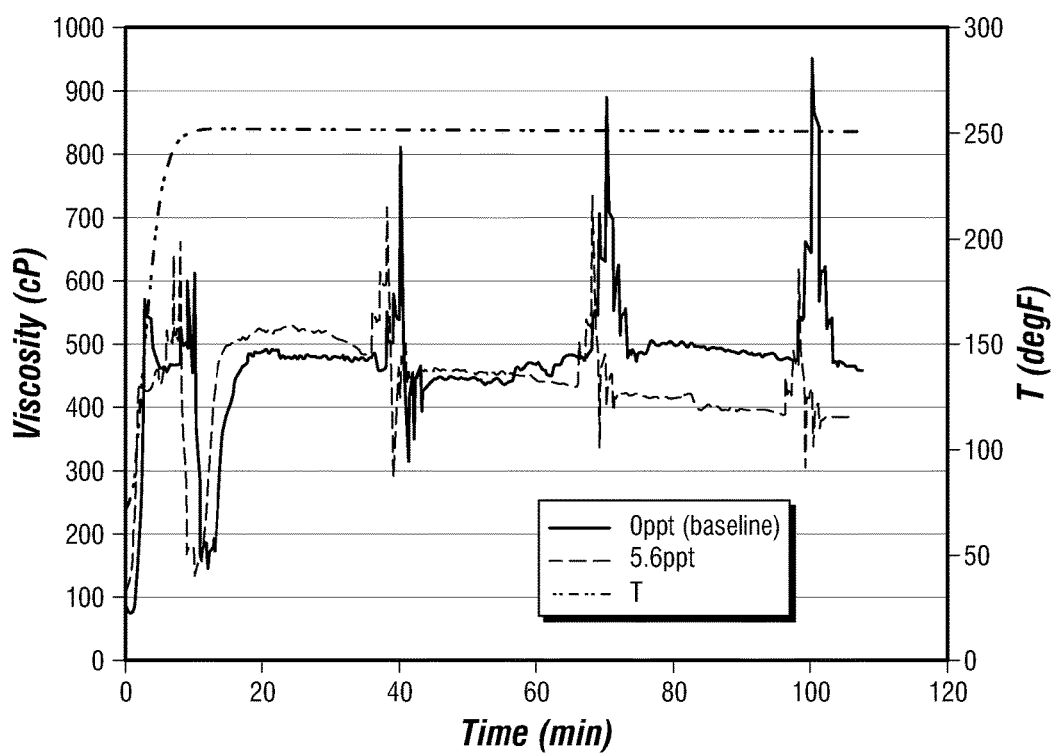
FIG. 2 shows a chart of viscosity and temperature over time for zirconate crosslinked HPG fluids containing calcium carbonate powder.

It is likely that some $CaCO_3$ powder still existed in the GLDA breaker solution of Example 1 without reacting with GLDA. Accordingly, the present example demonstrated that the $CaCO_3$ powder did not contribute significantly to the breaking of the zirconate-crosslinked HPG fluids. In FIG. 2, the baseline is the same as that in FIG. 1. 2 gpt of the GLDA breaker contains no more than 5.6 ppt of $CaCO_3$ powder (of course, some, if not most, $CaCO_3$ reacted with GLDA in the GLDA breaker solution). Therefore, 5.6 ppt $CaCO_3$ powder was added to the baseline HPG gel, and the viscosity was measured at 250° F., as shown in FIG. 2. Compared with the baseline, the viscosity of the gel containing 5.6 ppt $CaCO_3$ stayed at nearly the same level, suggesting that 5.6 ppt $CaCO_3$ powder did not significantly damage the gel at 250° F. Therefore, the breaking of the HPG gels was due to the GLDA salt.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

What is claimed is:

1. A well treatment method comprising:
   forming a well servicing fluid with ingredients including a GLDA salt, a viscosifying agent, and a crosslinker, the GLDA salt containing a metal cation chelated with a GLDA anion;
   inserting the well servicing fluid into a well in a formation;
   crosslinking the viscosifying agent and attaining a first viscosity of the well servicing fluid using the crosslinker; and
   after the attaining of the first viscosity, decreasing viscosity of the well servicing fluid in the well to a second viscosity less than the first viscosity by using the GLDA anion.

2. The method of claim 1 wherein the forming of the well servicing fluid occurs before the inserting of the well servicing fluid.

3. The method of claim 1 wherein the well servicing fluid is aqueous-based.

4. The method of claim 1 wherein the well servicing fluid is hydrocarbon-based.

5. The method of claim 1 wherein the GLDA salt is encapsulated by an encapsulant and the method further comprises delaying release of the GLDA salt using the encapsulant until after the inserting of the well servicing fluid.

6. The method of claim 1 wherein the viscosifying agent comprises guar, derivatized guar, polyacrylamide, or combinations thereof.

7. The method of claim 1 wherein the crosslinker comprises zirconium.

8. The method of claim 1 wherein the ingredients in combination exhibit a property such that an increased amount of GLDA salt increases a rate of the decrease in viscosity.

9. The method of claim 1 wherein the attaining of the first viscosity occurs after the inserting of the well servicing fluid into the well.

10. The method of claim 1 wherein the metal cation comprises calcium.

11. The method of claim 1 wherein decreasing the viscosity comprises counteracting the crosslinking and using the GLDA anion comprises chelating the crosslinker with the GLDA anion.

12. The method of claim 1 further comprising fracturing the formation using the well servicing fluid after the attaining of the first viscosity and before the decreasing of viscosity.

13. The method of claim 1 wherein the ingredients further comprise an acidic solvent of carbonate, the formation comprises a carbonate formation, and the method further comprises fracture acidizing the carbonate formation after the attaining of the viscosity and before the decreasing of viscosity.

14. A well treatment method comprising:
   forming a well servicing fluid with ingredients including a GLDA calcium salt, a polymer viscosifying agent, and a zirconium crosslinker, the GLDA calcium salt containing a calcium cation chelated with a GLDA anion;
   inserting the well servicing fluid into a well in a formation;
   crosslinking the polymer and attaining a first viscosity of the well servicing fluid using the crosslinker; and
   after the attaining of the first viscosity, decreasing viscosity of the well servicing fluid in the well to a second viscosity less than the first viscosity by chelating the crosslinker with the GLDA anion, which counteracts the crosslinking.

15. The method of claim 14 wherein the forming of the well servicing fluid occurs before the inserting of the well servicing fluid.

16. The method of claim 14 further comprising fracturing the formation using the well servicing fluid after the attaining of the first viscosity and before the decreasing of viscosity.

* * * * *